(12) United States Patent
Grundler et al.

(10) Patent No.: US 7,774,354 B2
(45) Date of Patent: Aug. 10, 2010

(54) METHOD AND SYSTEM FOR RESPONSE TIME OPTIMIZATION FOR TASK LIST RETRIEVAL FROM DATABASES

(75) Inventors: Jonas Grundler, Boeblingen (DE); Frank Neumann, Boeblingen (DE); Gerhard Pfau, Breitenstein (DE)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 11/832,942

(22) Filed: Aug. 2, 2007

(65) Prior Publication Data

US 2009/0037489 A1 Feb. 5, 2009

(51) Int. Cl.
G06F 7/00 (2006.01)
G06F 17/30 (2006.01)
(52) U.S. Cl. .................................. 707/759; 707/782
(58) Field of Classification Search .................. None
See application file for complete search history.

(56) References Cited

U.S. PATENT DOCUMENTS

| | | | |
|---|---|---|---|
| 6,339,769 B1 * | 1/2002 | Cochrane et al. ............... 707/2 |
| 6,546,402 B1 * | 4/2003 | Beyer et al. ................. 707/201 |
| 6,950,823 B2 * | 9/2005 | Amiri et al. .................... 707/10 |
| 7,065,527 B2 * | 6/2006 | McCartney et al. ........... 707/10 |
| 7,092,951 B1 * | 8/2006 | Luo et al. .................... 707/100 |
| 7,111,020 B1 * | 9/2006 | Gupta et al. ................. 707/201 |
| 7,167,853 B2 * | 1/2007 | Zaharioudakis et al. ........ 707/2 |
| 2002/0116457 A1 * | 8/2002 | Eshleman et al. ........... 709/203 |
| 2006/0219772 A1 * | 10/2006 | Bernstein et al. ............ 235/379 |
| 2007/0226203 A1 * | 9/2007 | Adya et al. ..................... 707/4 |
| 2009/0024569 A1 * | 1/2009 | Langer .......................... 707/2 |

* cited by examiner

Primary Examiner—Hosain T Alam
Assistant Examiner—Shew-Fen Lin
(74) Attorney, Agent, or Firm—Sawyer Law Group, P.C.

(57) ABSTRACT

Method and system for providing results for task list queries to Workflow Management Systems (WfMSs) and Human Task Management Systems (HTMSs). In one aspect, a method for providing the result of a task list query to a human task database includes caching data from the database in a plurality of materialized views. A new request for a list of tasks from the database is received, and a new query is created when the new request applies to the data in a particular materialized view. When the particular materialized view includes data that requires updating from more recent data in the database, the materialized view is so updated. The new query is executed against the data in the materialized view instead of executing the new query against the data in the database.

16 Claims, 5 Drawing Sheets

METHOD AND SYSTEM FOR RESPONSE TIME OPTIMIZATION FOR TASK LIST RETRIEVAL FROM DATABASES

FIELD OF THE INVENTION

The present invention relates to Workflow Management Systems (WfMSs) and Human Task Management Systems (HTMSs), and more particularly to providing results for queries to workflow and task data.

BACKGROUND OF THE INVENTION

Workflow Management Systems (WfMSs) and Human Task Management Systems (HTMSs) support the integration of human beings into business processes. Humans interact with these systems in different ways. The most common way a user accesses work items or human tasks managed by such a system is by retrieving his or her task lists and selecting (or checking out) the tasks he or she is planning to work with at a given point in time. As tasks are often assigned to more than one person, it is important that the system keeps track of who works on which task, and particularly, which tasks are waiting for someone to start working on them.

Most implementations of these systems use database technology to internally represent these tasks. Database management systems (DBMS) store extensive amounts of organized information for access by users of the systems. In a database system environment, the system responds to specific queries from the user as to which data from the database to examine, retrieve and/or present. Typically, the Workflow Management Systems (WfMSs) and Human Task Management Systems (HTMSs) run queries on behalf of a user in a particular syntax of a particular database language that is used by the system, such as the Structured Query Language (SQL) format.

Database queries are triggered by users and executed by the database system to retrieve task lists. Transactional database operations are used to "check out" a task for exclusive use by a user, and later to "check in" the same task after work on it has been finished.

Modern systems use a normalized database schema in order to keep costs low for create, retrieve, update, and delete operations (CRUD operations) of a database. In large systems with many thousands of users and hundreds of thousands of active tasks, the time to retrieve a list of tasks from the system may become an issue when using the standard database query approach. As a consequence, the costs in the database to carry out task list queries become huge, since complex database processing is required to present the entirety of data to users. In large applications, the time to retrieve even a short task list may be many seconds.

One way to mitigate this problem is to cache task lists on the client. The disadvantage of this approach is the amount of memory required on the client for caching the data, the complex programming model for the client which has to manage the cache, and the relative lack of timeliness of the data. Another way is to cache task lists on the Workflow Management Systems (WfMSs) or Human Task Management Systems (HTMSs), usually running on a middle tier application server. However, here the memory consumption problem is even more severe, as task lists are different for each user and therefore have to be cached for each user individually. Maintaining cache content is difficult and complicates the implementation of the Workflow Management Systems (WfMSs) and the Human Task Management Systems (HTMSs). WfMSs and HTMSs that run on a cluster are even more severely impacted, as the more members of the cluster are present, the more processing must be performed in order to keep cache contents consistent across the various cluster members.

Accordingly, what is needed is the ability to utilize advanced database technologies together with an intelligent data access mechanism to cache task lists on a database server and allow reduced time in retrieving tasks. The present invention addresses such a need.

SUMMARY OF THE INVENTION

The invention of the present application relates to providing results for task list queries to Workflow Management Systems (WfMSs) and Human Task Management Systems (HTMSs). In one aspect of the invention, a method for providing the result of a task list query to a human task database includes caching data from the database in a plurality of materialized views, each materialized view including data resulting from a query based on a request for a list of tasks from the database. For subsequent task list queries it is determined if the new request applies to the data in a particular one of the materialized views. After receiving the new request and before executing the new query, it is determined whether the particular materialized views includes data that requires updating from more recent data in the database. When updating is required, the particular materialized view is updated with more recent data from the database. The new query is executed against the data in the particular materialized view instead of executing the new query against the data stored in tables in the database.

The present invention allows a programming model neutral approach to utilize advanced database technologies together with an intelligent data access mechanism to speed up task list retrieval by caching task lists on the database server. The invention uses multiple materialized views to buffer task list data and thereby optimize database query performance and minimize load on the database server. Intelligent task list query rewriting can be used to further improve the presented approach. Using the invention, the average time to retrieve a task list can be reduced significantly.

DETAILED DESCRIPTION

Figure 1:
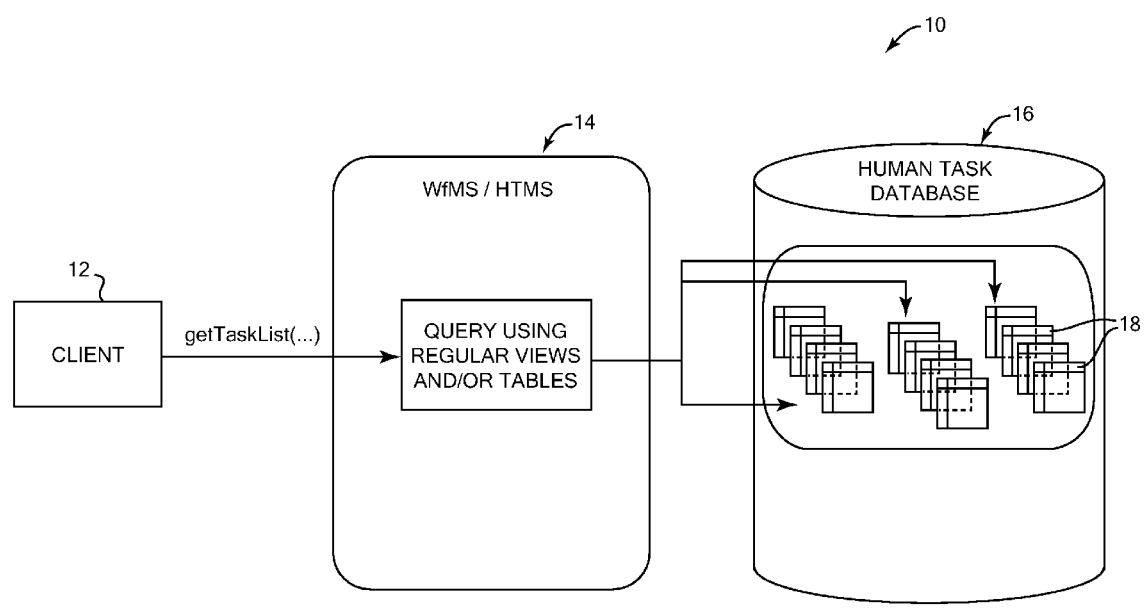
FIG. 1 is a diagrammatic illustration of a system of a prior art WfMSs/HTMSs allowing clients to retrieve task lists.

The present invention relates to Workflow Management Systems (WfMSs) and Human Task Management Systems (HTMSs), and more particularly to providing results for task list queries to these systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. A software embodiment can include but is not limited to firmware, resident software, microcode, etc. Furthermore, the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk (e.g., CD-ROM, DVD, etc.).

To more particularly describe the features of the present invention, please refer to FIGS. 1-5 in conjunction with the discussion below.

This disclosure describes a programming model neutral approach to utilize advanced database technologies together with an intelligent data access mechanism to cache task lists on the database server. In some embodiments, the invention combines the use of materialized views or materialized query tables with intelligent task list query rewriting and multiple-view buffering to optimize database query performance and to minimize load on the database server. Applying this solution, the average time to retrieve a task list can be reduced significantly. For example, the task list retrieval time can be reduced from many seconds in a prior implementation to a few milliseconds using the present invention.

The described embodiment combines the use of multiple technologies and mechanisms. Materialized views are used to cache the result of complex and expensive task queries. Task queries are parsed, analyzed for match with a materialized view, and rewritten to use a materialized table view, if applicable. A mechanism is established to refresh the materialized views in a customizable way. Background queries are used to refresh materialized view content in the background, minimizing response time for all task list retrieval operations.

Using Materialized Views for Task List Queries

Views can generally be considered as a declarative abstraction to a structured data set. A view is a virtual or logical table dynamically composed of the result set of a query, computed from data in the database. A view is not part of the physical storage of the database data (base tables). Changing the data in the database from which the view is derived alters the data shown in the view. Views also can join multiple data sources into a single virtual table, and thus offer simplified access to multiple underlying database tables, for example. The view implementation processes requests by translating a query into sub-queries for the referenced data source and combining the results effectively. A view definition typically contains additional filter criteria that further restrict the represented data set.

Materialized views differ from standard views in that the data represented by a view definition is physically stored ("materialized"), thereby avoiding the potential high cost of data retrieval and combination of the referenced data sources. Requests against a materialized view no longer access the underlying data (base tables) but can be efficiently processed against the physically stored ("materialized") data. If the underlying data (from which the materialized view was composed) changes, the present invention provides update mechanisms that asynchronously (e.g. timer based) or synchronously update the materialized views. This ensures that changes to data are reflected in the materialized representation as well.

FIG. 1 is a diagrammatic illustration of a system 10 of a prior art database allowing clients to retrieve task lists.

In a typical Human Workflow or Human Task application scenario, a client 12 issues a request to a WFMS or HTMS for retrieving a list of tasks. This is shown as "getTaskList( . . . )" in FIG. 1. The data retrieved may contain task data and business data from other sources. The request can specify several criteria, such as the priority of the tasks, the due date of the tasks, and/or a customer ID.

The WFMS or HTMS offers an API that allows clients to retrieve their task list. The WFMS/HTMS 14 uses the data in the request from the client 12 and the knowledge about who has issued the request to generate a query on tables 18 in the human task database 16. Depending on the requested information, the generated query may include a large number of database tables. The query is issued against the database system and the list of tasks with the selected properties is retrieved and returned to the client.

Figure 2:
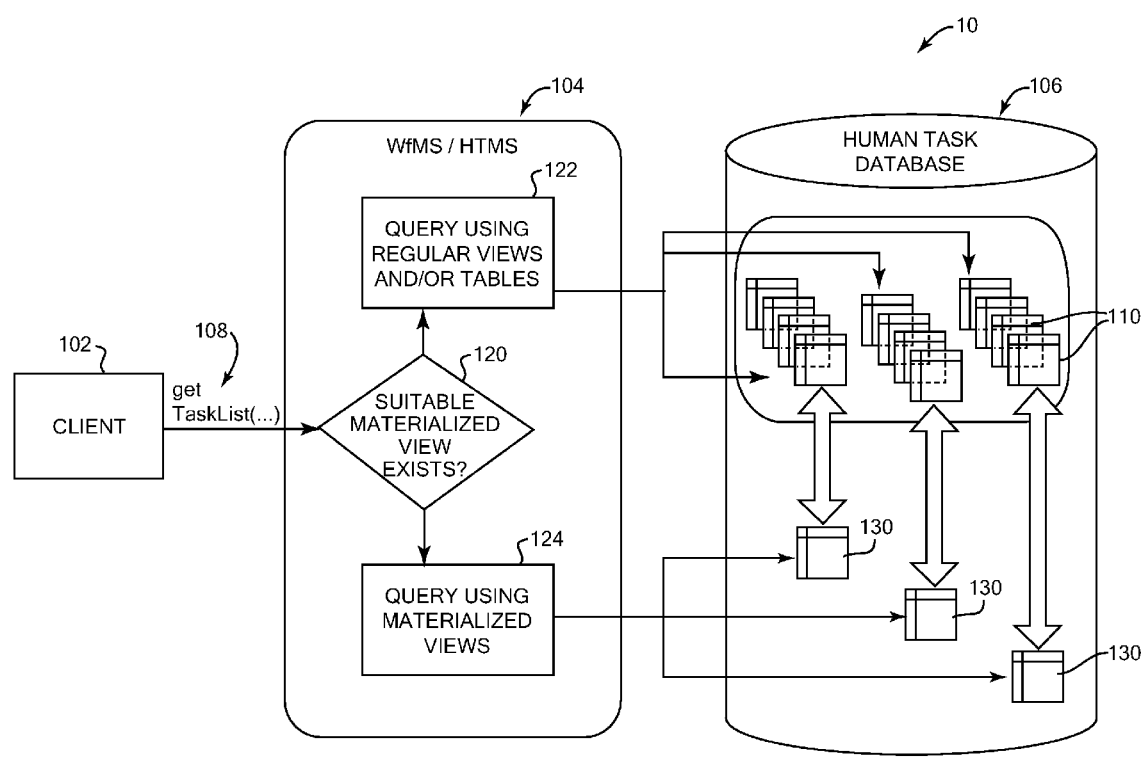
FIG. 2 is a diagrammatic illustration of a system of the present invention for executing queries against materialized views.

FIG. 2 is a diagrammatic illustration of a system 100 of the present invention, in which queries can be executed against materialized views. System 100 includes a client 102, a Workflow Management System (WFMS) or Human Task Management System (HTMS) 104, referred to as a "management system" herein, and a human task database 106.

One or more clients 102 can be any suitable computer system, electronic device, or program that can issue requests to the other components of the system, via a communication link such as a bus, network link, or wireless link. The management system 104 and human task database 106 can be implemented on the same computer system or different systems, e.g., different servers connected via a network or other communication link. The computer systems include standard components, such as processors (CPUs), storage devices (hard disk, magnetic tape, optical disk, etc.), I/O components, etc.

A client 102 sends a request 108 for a task list to the management system 104, shown as "getTaskList( . . . )". The management system 104 offers an API that allows clients to specify the retrieval of their task lists. Before generating the query for the database 106, the management system 104 analyzes the request of the client 102 in a step 120. A mapping definition is used to find a suitable materialized view that can be used to return the desired query results. Mapping definitions (mappings) to materialized views describe which requests can be routed to a materialized view returning the same result as a comparable query to the underlying base tables. There is a strong relationship between the mappings to a materialized view and the definition of that materialized view. Ordering criterion, selection predicates and selection criterion are taken into account to make sure that the expected query result set for the request is a subset of the data contained in the materialized view, and thus the materialized view is applicable.

If no suitable materialized view for the request is found in step 120, then the procedure continues to step 122, where the query is generated and executed as if no materialized views were defined. For example, task data 110 from the database 106 is retrieved and regular views and tables used to provide the query results. If a suitable materialized view is found in step 120, then in step 124 the query is generated in a way such that a materialized view 130 stored in database 106 (or other storage) is involved, instead of the regular database tables and views 110.

Figure 3:
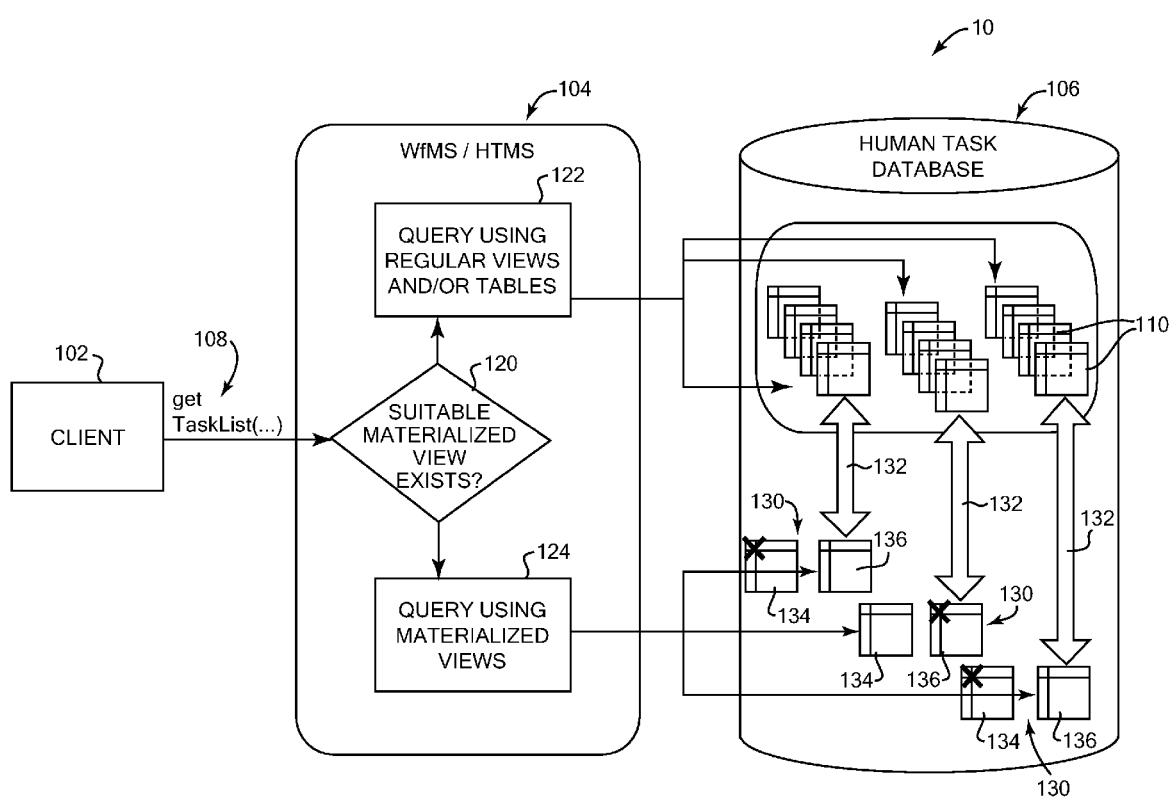
FIG. 3 is a diagrammatic illustration of the system of FIG. 2 in which a set of two respective materialized views are shown that are synchronized with database task data.

Queries against materialized views 130 are less expensive in terms of processing and time than queries against the original tables or views. For example, materialized views contain all or part of the data of a view, therefore less calculation is needed to retrieve the data from the underlying tables. Populating a materialized view with data based on a query A is similarly expensive as issuing query A against the original tables. Additional costs may be involved as the result is made persistent. FIG. 3 illustrates how the present invention makes the client unaware of the costs of building the materialized view. Finally, materialized views are created based on certain selection criteria, which, for example, can be optimized regarding the client programming (or query) model.

FIG. 3 is a diagrammatic illustration of the system 100 of FIG. 2 in which materialized views are shown synchronized with database task data. Arrows 132 indicate that the materialized views and the actual human task data are kept in synchronization. Most database management systems offer automatic synchronization which can be used for the materialized views of the present invention. Using this approach ensures that the materialized views 130 and the actual tables/views 110 always contain exactly the same data. However, from a performance perspective this approach is not feasible for WFMS or HTMS, due to the high processing footprint. Therefore, the present invention introduces a mechanism to refresh the materialized views under control of the management system 104. To avoid requests getting delayed while a refresh occurs, a double-buffering pattern with a set of two respective materialized views is applied as shown in FIG. 3.

The management system 104 takes care of refreshing the materialized views 130. Two specific materialized views 134 and 136 are created for each materialized view definition. The management system 104 manages the materialized views so that one of the materialized views 134 or 136 always includes current data and can be used to service requests from clients, while the other materialized view 134 or 136 is updated in the background. The materialized view 134 or 136 with the "X" mark shown in FIG. 3 is an example of one of the materialized views not having current data and thus being updated and not being used to service current requests from clients 102.

Figure 4:
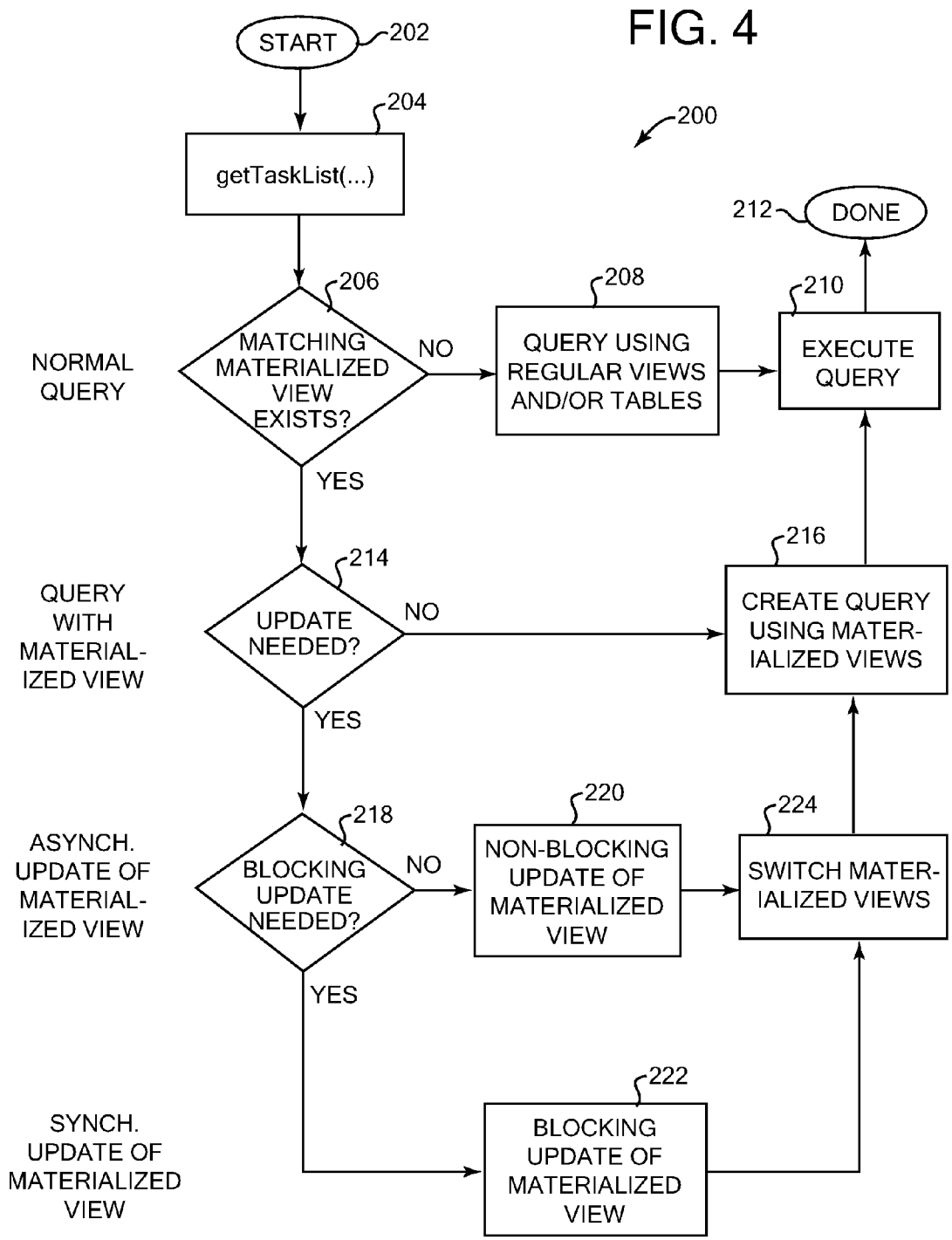
FIG. 4 is a flow diagram illustrating a method of the present invention used to manage materialized view tables.

FIG. 4 is a flow diagram illustrating a method 200 of the present invention used to manage materialized view tables. Method 200 can be implemented by program instructions or code provided for the management system 104, where the instructions can be stored by a computer readable medium. The medium can be an electronic, magnetic, optical, electromagnetic, infrared, or semiconductor medium or a propagation medium, including a semiconductor or solid state memory, magnetic tape, a removable computer diskette, a random access memory (RAM), a read-only memory (ROM), a rigid magnetic disk and an optical disk (CD-ROM, DVD, etc.). Alternatively, the method 100 or portions thereof can be implemented in hardware (logic gates, etc.), or in a combination of hardware and software.

The method starts at 202, and in step 204, a request is issued from the client for retrieving a task list, i.e., a task list retrieval operation is issued. In step 206, the system checks if a matching materialized view 130 exists, which can be used to run the task list query against. The check is performed by analyzing the query parameters and by matching them with criteria defined when creating the materialized view definition. If no matching materialized view is found, then in step 208 a standard query is provided which uses regular views and/or tables, and in step 210 the query is executed. The method is then complete at 212.

If a matching materialized view has been found in step 206 by analyzing the query and comparing it with the materialized view mapping definitions as explained above, then this materialized view is used. In step 214, the currency of the data in the materialized view table is checked. To avoid periodic updates even in situations where a materialized view is not used, updates are triggered by incoming task list queries in the present invention. In an alternate embodiment of the invention, the updates can be performed using a daemon running in the background of the system that refreshes the materialized view content periodically in the background. While this imay be easier to implement, it produces an undesirable base load on the system, even when there are no incoming client requests. It also offers less control than the other mechanism described herein.

Before executing a query on a materialized view the system checks if an update of the materialized view table has to be triggered. This is done using predetermined configuration parameters for each materialized view table, which for example can be set by the system administrator based on the business knowledge of the system and on data gathered during the operation of the system. An example for such a configuration parameter is a maximum age of the data (max_age) in the materialized view table. Other parameters can include the maximum number of changes performed on the database tables used when retrieving the data for a particular materialized view.

Task systems with very many concurrent users and a short work time per task need more frequent refreshes than systems with fewer users or longer task processing times. The system provides a max_age configuration parameter and utilizes it to decide if updates for a materialized view are required, based on the age of the data in the materialized view tables. The system decides against updating when the age of the data is less than or equal to the max_age configuration parameter, and decides to update if the age of the data is greater than the max_age configuration parameter. If no updates are required, then the method continues to step 216 to create a query using the materialized views. In step 210, the created query is then executed to provide the task lists requested by the client. The process is thus complete at 212.

If an update is required in step 214, e.g. because the data in the table is too old, then in step 218 the system determines if the data in both views 134 and 136 (tables) of the materialized view 130 is outdated or not appropriate to be used by applying the same decision as in 214. If just one table contains outdated data, then in step 220 an update of the outdated materialized view table is triggered in the background (this is considered the background materialized view table), and the data in the other (foreground) materialized view table is used for the query. This is called a non-blocking update, as the query can be executed immediately and data can be returned without having the client or user wait for all materialized view tables to be refreshed. The method then continues to step 224, described below.

If the data in both the foreground materialized view table and the background materialized view table are outdated, or no data exists in the materialized view tables, then the query cannot be executed before updates are made. The client must wait until current data becomes available. In this case the method proceeds from step 218 to step 222, in which a blocking update is performed, which is an update where the user has to wait for the materialized view table to be refreshed. For example, the background table can be updated with the current data from the database, as explained above. In an alternate embodiment, the foreground table also can be updated in step 222.

A blocking update is required, for example, when the first user issues a query at the beginning of the work day when there have not yet been any materialized views previously created. The blocking update may be required also for the first query that uses a particular materialized view. In such cases a blocking update of the materialized view table is performed before the client query is run.

After a successful update (blocking or non-blocking) is carried out in step 220 or 222, step 224 is performed in which the foreground and background tables of the materialized view are switched. This ensures that after the updates, queries that are performed access the most current data.

The query is created using the materialized views in step 216, and in step 210 the query is executed using data in the materialized view and the result is returned to the requester (client 102). In the case of a non-blocking update of step 220, steps 216 and 210 can be performed immediately, without waiting for the background table to be updated in step 220 and switched in step 224. In the case of a blocking update of step 222, steps 216 and 210 are performed after the update and switch are complete. The process is then complete at 212.

As indicated in FIG. 4, the various results of the process can be labeled appropriately. The steps 208 and 210 are a normal query procedure, going from step 214 to step 216 is a query with a materialized view (without updates), going from step 218 to steps 220 and 224 is an asynchronous update of a materialized view, and going from step 218 to step 222 (and step 224) is a synchronous update of a materialized view.

Applying Incremental Update Functionality to Materialized Views

The implication of the approach described above is that data in the materialized views does not reflect changes that have been made to the underlying tables after the materialized view results have been stored. Strictly speaking, data in the materialized views may not always be consistent with the data in the base tables. This can be mitigated if changes to the base tables are tracked in a modification list, and these changes are then considered when the materialized view is queried ("Change Tracking"). Consideration of tracked changes produces additional load on the database server, therefore change tracking should only be applied to changes that are of most interest ("Scoping").

The procedure for performing Change Tracking is as follows. If the management system 104 makes changes to table rows that are queried by materialized views, an entry (key) with a timestamp is added to a modification list. The row(s) of interest are contained in the set of the rows in the materialized view that are identified by this key. This implies that all changes to the data used by the management system 104 are managed solely through the management system. Furthermore, each row in the materialized view must contain the keys of the rows that influence the contents of this particular row.

If a query is routed to a materialized view with modification list, the query is rewritten. Let Q_MV be the query that is executed against the materialized view in case that no modification list is used, and Q_OT be the original query that is executed against the base tables if there were no materialized views defined. Also let A be the condition that the key of a tracked change is contained in a row of the materialized view; let R(query, c) be the result of the query where all results satisfy the condition c; and let D(R(query, c)) be the unique result of the result R(query, c). Uniqueness occurs when no 2 elements of the query contain the same contents.

The query is rewritten to:

$$D^* = D(R(Q\_MV, \text{not } A) + R(Q\_OT, A)).$$

Thus, rewritten query D* includes a query against the (foreground) materialized view, and a query only against the original data in the database tables that satisfies A (i.e., having a row with a tracked change). The result of D* is the same result as D=D(Q_OT). The differences between D* and D are as follows. D might return a result with non-unique elements; typical task list queries do not show duplicate results (duplicate rows), so this is not considered to be a restriction which occurs in real-life scenarios. In addition, the costs for calculating D* are less than the costs of calculating D, if A applies to few elements only.

Figure 5:
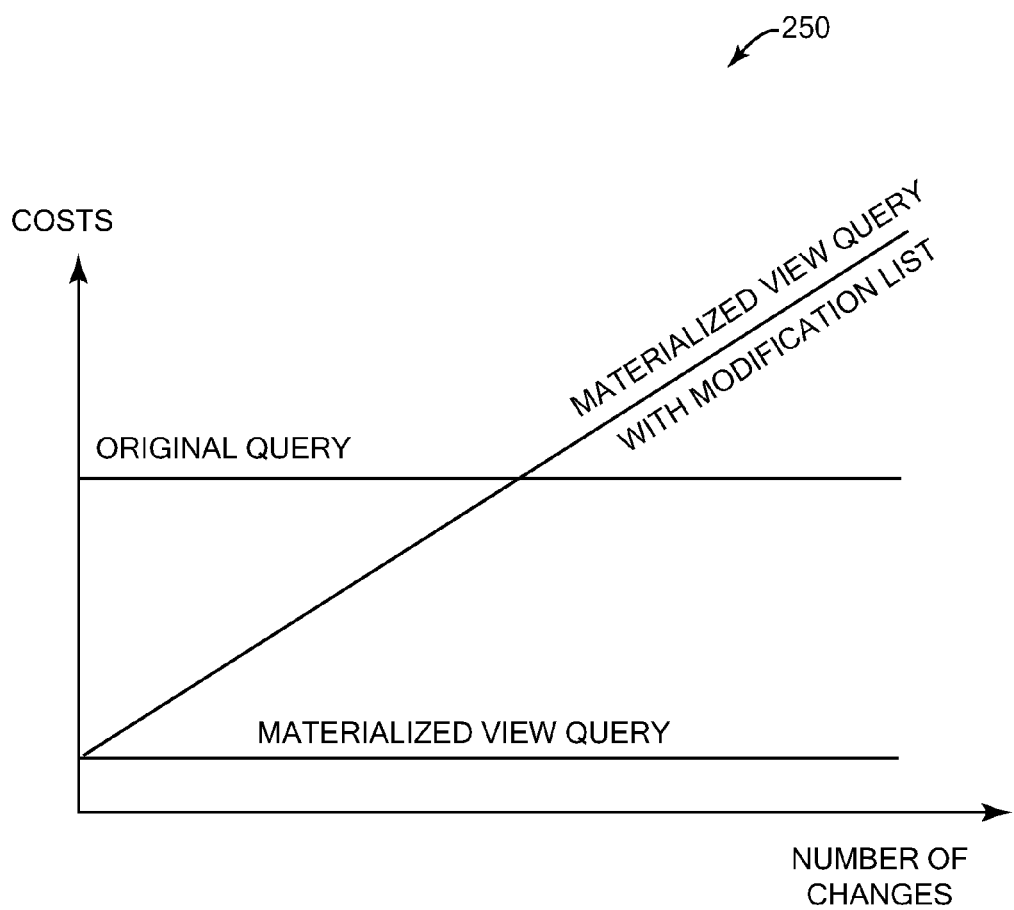
FIG. 5 is a diagrammatic illustration of a graph showing an example of query processing cost increase if modification lists are used, depending on the number of changes to the underlying data.

FIG. 5 is a diagrammatic illustration of a graph 250 showing an example of query processing cost increase depending on the number of changes to the underlying data that were made and tracked in a modification list. The graph shows the processing costs for original queries, queries against materialized views, and queries against materialized views with modification list.

Costs for queries against materialized views are lower than the costs for queries against the base tables (original query). If the modifications are tracked in a modification list, the costs increase with the number of changes that are tracked.

The procedure for performing Scoping is as follows. Additional processing cost optimizations (and therefore response time optimizations) can be achieved taking into account what is of interest for the user (or system) which issues the query. That is, the number of changes that have to be taken into account can be reduced by applying a combination of the following restrictions to the considered entries in the modification list.

First is property-based scoping, in which only those keys in the modification list that have a certain property are considered. For example, only newly created objects in the modification list can be considered. Second is context-based scoping, in which only those keys in the modification list that match a property of the query context are considered. The context is established when executing the query. For example, only those keys in the modification list can be considered that have been created on behalf of actions of the particular user or client which executes the query.

Cost-Based and Response-Time-Based Optimization for Materialized Views with Modification List Costs for queries against materialized views with modification list can be optimized to achieve two different goals: 1) shorten query response times for best user experience, and 2) lower CPU utilization. The first goal is achieved by refreshing the materialized view often, such that few tracked changes exist, and the query response time is as fast as possible as a consequence. The second goal is achieved by solving a simple optimization task: minimize the sum of the costs that are generated by queries against the materialized view with modification list.

In some embodiments, the time to refresh the materialized views can be determined as follows. The next refresh should take place once the newly calculated average of the costs is greater than the current calculated average of the costs, that is:

$$(C\text{sum}+Cr+Cq)/(q\text{Count}+1) > (C\text{sum}+Cr)/q\text{Count}.$$

In this equation, Cr is the costs for refreshing the materialized view, Cq is the costs of the last query that has been executed against the materialized view with modification list, Csum is the costs of all queries since start of the last refresh of the materialized view, qCount is the number of queries since the last refresh of the materialized view, and Cavg is the average cost per query (Cavg=Csum).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing the result of a task list query to a human task database, the method comprising:
   caching data from the database in a plurality of materialized views, each materialized view including data resulting from a query based on a request for a list of tasks from the database;
   receiving a new request for a list of tasks from the database, and creating a new query after determining that the new request applies to the data in a particular one of the materialized views, wherein the particular materialized view includes a foreground table and a background table, each storing data resulting from the query, the data stored in the foreground table being updated more recently than the data stored in the background table wherein in response to only the background table requiring updating, the executing of the new query against the data in the foreground table is begun immediately after determining that only the background table requires updating; and
   wherein the updating of the particular materialized view is a non-blocking update to the data in the background table, such that the non-blocking update does not delay the executing of the new query, and
   after the non-blocking update is complete, further comprising switching the tables such that the background table becomes the foreground table and the foreground table becomes the background table, wherein in response to both the foreground table and the background table requiring updating, the updating of the particular materialized view is a blocking update to the data in the background table, such that the executing of the query is delayed,
   wherein after the blocking update is complete, further comprising switching the tables such that the background table becomes the foreground table and the foreground table becomes the background table,
   wherein the executing of the new query on the data in the particular materialized view is begun after the updating and switching are complete;
   after receiving the new request and before executing the new query, determining whether the particular materialized view includes data that requires updating from more recent data in the database wherein determining whether the particular materialized view includes data that requires updating includes:
   determining whether data in the foreground table requires updating and whether data in the background table requires updating, and
   checking a characteristic of the data in the particular materialized view and comparing the characteristic to a predetermined parameter;
   in response to determining that updating is required, updating the particular materialized view with more recent data from the database; and
   executing the new query against the data in the foreground table of the particular materialized view instead of executing the new query against the data stored in tables in the database.

2. The method of claim 1 wherein the updating is performed periodically using a daemon running in a background process of the human task database.

3. The method of claim 1 wherein the checked characteristic of the data in the particular materialized view is an age of the data and the predetermined parameter is a predetermined maximum age parameter, and wherein determining whether the particular materialized view needs updating includes comparing the age of the data in the particular materialized view with the maximum age parameter, wherein the data is determined to need updating when the age of the data is determined to need updating when the age of the data is greater than the maximum age parameter.

4. The method of claim 1 further comprising:
   tracking changes to the data in the database in a modification list, wherein the changes have not been made to the cached data in the particular materialized view,
   rewriting the new query, and
   executing the rewritten query such that the relevant changes to the data in the database are included in the result of the new query.

5. The method of claim 4 wherein the new query is rewritten to include a first query executed against the foreground table in the materialized view and a second query executed against only the changed data in the database, the changed data including at least one of the changes that have not been made to the cached data in the particular materialized view.

6. The method of claim 4 wherein the number of changes taken into account by the rewritten query is reduced from the total number of changes that have occurred in the database, wherein the reduced number of changes is determined by considering only changes of data that has a predetermined particular property.

7. The method of claim 6 wherein the predetermined particular property of the data is that the data is newly created in the database.

8. The method of claim 4 wherein the number of changes taken into account by the rewritten query is reduced from the total number of changes that have occurred in the database, wherein the reduced number of changes is determined by considering only changes of data that match a predetermined particular property of the new query.

9. The method of claim 4 wherein the number of changes taken into account by the rewritten query are reduced from the total number of changes that have occurred, wherein the reduced number of changes are determined by considering only changes of data that was created in behalf of actions of a user who executes the new query.

10. A computer program product for providing the result of a task list query to a human task database, the computer program product comprising:

a computer readable storage medium having computer readable program code embodied therewith, the computer readable program code configured to:

cache data from the database in a plurality of materialized views, each materialized view including data resulting from a query based on a request for a list of tasks from the database;

receive a new request for a list of tasks from the database, and create a new query after determining that the new request applies to the data in a particular one of the materialized views, wherein the particular materialized view includes a foreground table and a background table, each storing data from the query, the data stored in the foreground table being updated more recently than the data stored in the background table;

after receiving the new request and before executing the new query, determine whether the particular materialized view includes data that requires updating from more recent data in the database;

in response to determining that updating is required, update the particular materialized view with more recent data from the database; and execute the new query against the data in the foreground table of the particular materialized view instead of executing the new query against the data stored in tables of the database wherein the computer readable program code configured to determine whether the particular materialized view includes data that requires updating, includes computer readable program code configured to:

determine whether data in the foreground table requires updating and whether data in the background table requires updating; and check a characteristic of the data in the particular materialized view and comparing the characteristic to a predetermined parameter, wherein in response to only the background table requiring updating, the executing of the new query against the data in the foreground table is begun immediately after determining that only the background table requires updating, wherein the update of the particular materialized view is a non-blocking update to the data in the background table, such that the non-blocking update does not delay the execution of the new query, and after the non-blocking update is complete, the computer readable program code is further configured to switch the tables such that the background table becomes the foreground table and the foreground table becomes the background table, wherein in response to both the foreground table and the background table requiring updating, the updating of the particular materialized view is a block update to the data in the background table, such that the executing of the query is delayed, wherein after the blocking update is complete, the computer readable program code is further configured to switch the tables such that the background table becomes the foreground table and the foreground table becomes the background table, wherein the executing of the new query on the data in the particular materialized view is begun after the update and switch are complete.

11. The computer program product of claim 10 wherein the checked characteristic of the data in the particular materialized view is an age of the data and the predetermined parameter is a predetermined maximum age parameter, and wherein the determination of whether the particular materialized view needs updating includes comparing the age of the data in the particular materialized view with the maximum age parameter, wherein the data is determined to need updating when the age of the data is greater than the maximum age parameter.

12. The computer program product of claim 10 wherein the computer readable program code is configured to:

track changes to the data in the database in a modification list, wherein the changes have not been made to the cached data in the particular materialized view;

rewrite the new query; and execute the rewritten query such that the relevant changes to the data in the database are included in the result of the new query.

13. The computer program product of claim 12 wherein the new query is rewritten to include a first query executed against the foreground table in the materialized view and a second query executed against only the changed data in the database, the changed data including at least one of the changes that have not been made to the cached data in the particular materialized view.

14. A system for providing the result of a task list query to a human task database, the system comprising:

a memory; and at least one processor, the at least one processor performing:

caching data from the database in a plurality of materialized views, each materialized view including data resulting from a query based on a request for a list of tasks from the database;

receiving a new request for a list of tasks from the database, and creating a new query after determining that the new request applies to the data in a particular one of the materialized views, wherein the particular materialized view includes a foreground table and a background table, each storing data resulting from the query, the data stored in the foreground table being updated more recently than the data stored in the background table;

after receiving the new request and before executing the new query, determining whether the particular materialized view includes data that requires updating from more recent data in the database;

in response to determining that updating is required, updating the particular materialized view with more recent data from the database; and executing the new query against the data in the foreground table of the particular materialized view instead of executing the new query against the data stored in tables in the database wherein the processor determining whether the particular materialized view includes data that requires updating includes the processor;

determining whether data in the foreground table requires updating and whether data in the background table requires updating; and checking a characteristic of the data in the particular materialized view and comparing the characteristic to a predetermined parameter, wherein in response to only the background table requiring updating, the processor begins to execute the new query against the data in the foreground table immediately after determining that only the background table requires updating, wherein the updating of the particular materialized view is a non-blocking update to the data in the background table, such that the non-blocking update does not delay the executing of the new query, and after the non-blocking update is complete, the processor switches the tables such that the background table becomes the foreground table and the foreground table becomes the background table, wherein in response to both the foreground table and the background table requiring updating, the updating of the particular materialized view is a blocking update to the data in the background table, such that the processor delays the executing of the query, wherein after the blocking update is complete, the processor switches the tables such that the background table becomes the foreground table and the foreground table becomes the background table, wherein the processor begins the executing of the new query on the data in the particular materialized view after the updating and switching are complete.

15. The system of claim 14 wherein the checked characteristic of the data in the particular materialized view is an age of the data and the predetermined parameter is a predetermined maximum age parameter, and wherein the processor determining whether the particular materialized view needs updating includes the processor comparing the age of the data in the particular materialized view with the maximum age parameter, wherein the data is determined to need updating when the age of the data is greater than the maximum age parameter.

16. The system of claim 14 wherein the processor further performs:

tracking changes to the data in the database in a modification list, wherein the changes have not been made to the cached data in the particular materialized view;

rewriting the new query; and executing the rewritten query such that the relevant changes to the data in the database are included in the result of the new query.

* * * * *